US012430250B2

(12) United States Patent
Shao et al.

(10) Patent No.: US 12,430,250 B2
(45) Date of Patent: Sep. 30, 2025

(54) CACHE-DESIGNING METHOD WHERE CACHE DATA AND CACHE-MISS INFORMATION SHARE THE SAME STORAGE SPACE

(71) Applicants: Huazhong University of Science and Technology, Wuhan (CN); ZHEJIANG LAB, Hangzhou (CN)

(72) Inventors: Zhiyuan Shao, Wuhan (CN); Sitong Lu, Wuhan (CN); Xiaofei Liao, Wuhan (CN); Hai Jin, Wuhan (CN)

(73) Assignees: HUAZHONG UNIVERSITY OF SCIENCE AND TECHNOLOGY, Wuhan (CN); ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/893,397

(22) Filed: Sep. 23, 2024

(65) Prior Publication Data
US 2025/0139005 A1 May 1, 2025

(30) Foreign Application Priority Data
Oct. 31, 2023 (CN) .......................... 202311431298.7

(51) Int. Cl.
G06F 12/08 (2016.01)
G06F 12/0802 (2016.01)
(52) U.S. Cl.
CPC .................. *G06F 12/0802* (2013.01)
(58) Field of Classification Search
CPC . G06F 12/0802; G06F 12/0895; G06F 9/3851
See application file for complete search history.

(56) References Cited

U.S. PATENT DOCUMENTS 5,544,342 A * 8/1996 Dean .................. G06F 12/0862
711/119

FOREIGN PATENT DOCUMENTS

| CN | 105955711 A1 | 9/2016 |
| CN | 115357292 A1 | 11/2022 |
| CN | 115618336 A | 1/2023 |

\* cited by examiner

*Primary Examiner* — Jae U Yu
(74) *Attorney, Agent, or Firm* — Michael Ye; Kalos Athena Wang PLLC

(57) ABSTRACT

A cache-designing method using cache lines to record cache-miss information is provided, wherein cache lines and cache-miss information are stored in a common storage space by means of shared storage. Tags of cache lines, as well as cache lines and cache-miss information, are stored separately in different static random-access memories, wherein multiple independent memories are used for tags, while a single memory is for cache lines and cache-miss information. A request-processing pipeline and a response-processing pipeline are constructed to be parallelable and used respectively for processing memory-access requests and for processing memory-response data. As compared to existing non-blocking cache designs that support plenty of miss status holding registers, the present disclosure allows storage sharing between cache data and cache-miss information, and leverages dual-port feature of static random-access memories in FPGA, so as to design separate pipelines to achieve memory access respectively for memory-access request processing and for memory-response data processing.

20 Claims, 4 Drawing Sheets

CACHE-DESIGNING METHOD WHERE CACHE DATA AND CACHE-MISS INFORMATION SHARE THE SAME STORAGE SPACE

BACKGROUND OF THE APPLICATION

1. Technical Field

The present disclosure relates to structures of computer systems, and more particularly to a cache-designing method where the storage space is shared between cache data and cache-miss information.

2. Description of Related Art

A non-blocking cache uses miss status holding registers (MSHRs) to record the cache-miss information at the time of cache miss, so as to maintain operation of the cache system and eliminate blocking even if data missing has not been handled. This optimization approach to reducing costs for cache misses has been extensively used in modern processors. Cache-miss information includes the ID of the missed request, the tag of the missed cache line, and the intra-line offset. An MSHR entry comprises a tag domain for recording the tag of the missed cache line and a plurality of slots (hereinafter referred to as sub-entries) for recoding the request ID and the intra-line offset.

In the event of a miss in a non-blocking cache, it is necessary to check the MSHR array to see whether there is any entry matching the tag of the requested cache line. If the result is negative, a new entry is allocated so as to record the cache-miss information, and a request for the missed data is made to the memory. If the result is positive, there is no need to allocate a new entry and additionally send a data request. After the entry is allocated or identified, the information of the miss request is recorded in the idle sub-entry just after the occupied sub-entries. When the missed data is returned from memory, the process involves looking up again and releasing the corresponding entry, and generating a memory access response according to the information of each of its sub-entries, thereby completing miss handling. In the event of a miss, if there are no more idle entries in the MSHR array, or the required entry has no more idle sub-entries, blocking can still happen.

CN115357292A has disclosed a non-blocking data cache structure, which comprises a data access module and a non-blocking miss handling module. The data access module processes a memory access instruction from an external processor and divides the data loading pipeline into three stages and divides the main pipeline into four stages. The non-blocking miss handling module processes missed instructions and implements pipelining for the missed instructions to request data from the next-level memory.

Non-blocking caches are useful for improving memory access throughput. In a field-programmable gate array (FPGA), plural parallel processing elements may be configured to support plenty of uncompleted memory-access requests so as to overlap memory-access processing windows, thereby maximizing the performance. In this regard, a study has realized miss status holding register by thousands using static random-access memories (Static RAMs or SRAMs), so as to handle misses generated by a large number of memory-access requests in a field-programmable gate array (FPGA). This research came to the conclusion that for applications having limited memory-access bandwidth and being less sensitive to memory-access delay, the use of a large-capacity MSHR array provides performance gain comparable to that provided by using a large-capacity cache while consuming less static storage resources.

Although huge amounts of miss status holding registers can be boosters to FPGA applications, the effect by some means depends on reasonable configuration thereof. Opposite to a cache that can hold cache data for a long period, a miss status holding register becomes idle after returning the corresponding missed data. The required number of miss status holding registers varies with memory-access locality of different applications and workloads. While overprovisioning can lead to waste in resources, under-provisioning may adversely affect performance. Thus, without understanding of characteristics of memory-access locality or variation of load types for specific applications, reasonable configuration of miss status holding registers will be a problem.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY OF THE APPLICATION

In view of the shortcomings of the art known by the inventor(s), the present disclosure provides a cache-designing method where the cache entries and MSHR entries share the same storage spaces. The designed cache features for ability to adapt itself to memory access locality of a specific application by automatically shifting the role of the storage space between cache data and cache-miss information, thereby catering to different access characteristics. The present disclosure further provides a dual-pipeline designing method that supports parallel processing of memory-access requests and memory-access responses. It leverages the dual-port feature of SRAMs in a FPGA and overcomes port contention at memories due to storage sharing, so as to improve the cache throughput.

In order to achieve the foregoing objectives, the present disclosure provides a cache-designing method where cache data and cache-miss information share the same storage space, which comprises the following steps.

At the step D1, the cache entries and MSHR entries are designed to have the same format, and then, cache data and cache-miss information are stored in the common storage space by means of shared storage.

The step D2 is about storing the metadata of cache and MSHR entries on one hand as well as cache lines and cache-miss information (i.e., sub-entries of MSHRs) on the other hand separately into different SRAMs. Specifically, the metadata (including a valid bit, the tag of the requested/cached cache line, a transfer flag bit, and a sub-entry counter) of entries are stored in a SRAM different from that storing cache lines and sub-entries. The memory for storing metadata (hereinafter referred to as the metadata SRAM) can be implemented using plural independent SRAMs. The memory for storing cache lines and sub-entries (hereinafter referred to as the data SRAM) is implemented using a single SRAM.

At the step D3, two parallelable pipelines are constructed, one for processing memory-access requests (hereinafter referred to as the request-processing pipeline) and the other for processing memory-access responses (hereinafter referred to as the response-processing pipeline). Provision of the two parallelable pipelines helps to overcome the pipeline contention between the request processing and response processing. By leveraging the dual-port feature of the SRAMs in the FPGA and providing two pipelines, the present disclosure overcomes the problem about pipeline contentions and further improve the performance.

By making the cache entries and MSHR entries having the same format, the method of the present disclosure allows cache data and cache-miss information to share the same SRAMs, so as to well tolerate a large number of cache misses, decrease miss penalty, and improve system throughput. Moreover, the cache so designed can adapt itself to cache hits or misses of the application during operation, thereby automatically shifting the role of the storage space between cache lines and cache-miss information, so as to cater to different access characteristics, overcome the configuration difficulty of MSHRs, and save storage resources.

Many existing computer systems use caching to unburden databases and to improve system performance as well as throughput because caching helps to reduce the frequency of database access and is useful to significantly enhance system performance when the cache space is used reasonably for data caching. However, if the cache space becomes "bursted", subsequent updating requests can be blocked, and this can seriously degrade performance and stability of the system. Hence, efficient management of cache space is technically critical for persistence and consistence of data. For example, CN115618336A discloses a cache, its operation method, and a computer device using the cache. The cache includes: a data array, a tag array, and a flag array. Therein, cache lines, tags, and flag lines correspond to one another one to one. Each flag line is used for storing a second number of memory flags associated with a first number of flag storage unit entries stored in the corresponding cache line. The memory flags stored in the flag lines have a mapping relation with the memory addresses of the associated flag storage unit entries. The known scheme involves: in response to a hit of cache query made with memory access addresses, acquiring second memory flags corresponding to memory access addresses from the flag array; and comparing the acquired first memory flag and the acquired second memory flag so as to determine whether the first memory flag and the second memory flag match each other. While the known scheme of flagging memory space may be effective in improving memory access safety of a computer system, it is unable to process requests and execute programs at the same time, making memory access throughput limited. Opposite to the known scheme, the present disclosure uses a dual-pipeline structure for parallel processing to overcome pipeline contentions requests and responses. Specifically, such parallel processing includes processing memory-access requests in the request-processing pipeline and processing memory-access responses in the response-processing pipeline. If only one pipeline is provided, when a cache miss and a memory response arrive at the single pipeline at the same cycle, the single pipeline suffers the pipeline contention where the memory response is prioritized, and the cache miss is pended until no memory response is waiting to be processed. Hence, the present disclosure leverages the dual-port feature of the SRAMs to realize the dual-pipeline structure for processing memory-access requests and memory-access responses in parallel, so as to overcome the pipeline contentions.

There have been some buffering solutions based on multiple parallel pipelines proposed with the attempt to achieve non-blocking miss processing. For example, CN105955711A discloses a buffering method capable of supporting non-blocking miss handling. Therein, for a processor, when a cache miss occurs during request processing, the missed request is temporarily stored in a missing instruction queue through buffering, so as to allow the pipeline to continue to send a subsequent irrelevant request, and hide the miss cost in the normal processing of the irrelevant request, thereby reducing the cost for miss through buffering and reducing the access time delay. In the known scheme, the buffer is composed of a control module and storage bodies and shared by plural pipelines. Different missed requests selectively enter the storage bodies through the control module, and after returning from the DDR SDRAM to the processing module, they are sent to the control module to be processed together. This approach further lowers actual miss costs and in turn improves pipelining efficiency. However, in this known scheme, plural pipelines share a common port and this leads to port contention, which is exactly the issue the present disclosure is intended to address. Specifically, in the present disclosure, the second ports of the metadata SRAMs are shared by the request-processing pipeline (for MSHR entry allocation and counter update) and the response-processing pipeline (for metadata fetching and MSHR entry deallocation). If port contention happens in any of the metadata SRAMs, the cache according to the present disclosure performs operations either in the priority order of: writing by the request-processing pipeline, writing by the response-processing pipeline, and reading by the response-processing pipeline; or in the priority order of: writing by the response-processing pipeline, writing by the request-processing pipeline, and reading by the response-processing pipeline. The response-processing pipeline or the request-processing pipeline can be stalled if necessary, and this makes the present disclosure completely a contrary to the known scheme that tries to prevent pipelines from being stalled. In other words, with the inventive dual-pipeline-based parallel processing, the present disclosure leverages the dual-port feature of the SRAMs in the FPGA to achieve reasonable and efficacious allocation.

Preferably, the step D1 comprises the following steps.

At D1.1, in the event of a cache miss, the entry in which the missed cache line should be placed is used as an MSHR entry to record cache-miss information. A cache miss happens when the processor cannot find the required data or instruction in the cache and thus needs to acquire data from a slower level in the memory hierarchy. This process consumes more time and consequently makes execution of the program less efficient. Specifically, in the present disclosure, the cache system not only stores application data, but also registers cache-miss information, making each entry be able to act both a cache entry and an MSHR entry. When there is a miss, an idle entry is used to register the cache-miss information, and after the missed data is returned, the entry takes up its original role again. In this way, the cache system can adapt itself to memory access hits or misses of the application during operation, thereby automatically shifting the role of the storage space between cache data and cache-miss information, so as to cater to different characteristics of memory access locality. Meanwhile, the present disclosure helps to reduce overall storage overheads compared to implementing separated cache and MSHR arrays.

The step D1.2 is about adding one transfer flag bit to each of the entries, so as to determine whether a said entry is used as an MSHR entry. Particularly, one extra transfer flag bit (M) is added to each of the entries, so that the cache system can use this flag to determine whether the matched entry is an MSHR entry or a cache entry, and to determine the following operations. Additionally, one sub-entry counter is added to each of the entry. Thereby, when the entry is used as an MSHR entry, the sub-entry counter counts the number of active sub-entries that have been loaded with cache-miss information.

Preferably, the D2 comprises the following steps.

At the step D2.1, metadata of entries are stored in plural independent SRAMs (hereinafter referred to as the metadata SRAMs) while the cache data and cache-miss information are stored in a single SRAM (hereinafter referred to as the data SRAM). Therein, the data SRAM has its entries in one-to-one correspondence with entries of the metadata SRAMs. The plural metadata SRAMs support the set-associative mapping and parallel searching for the entries, while a single SRAM (in true-dual-port mode) is enough for the data fields of the entries considering the fact that at most two (as we use two parallel pipelines) entries are matched per cycle and need to be read or written. Preferably, in the present disclosure, entries are mapped and stored using Cuckoo hash, so as to enhance the load factor for hash storage. Specifically, for each of the plural metadata SRAMs, a different hash function is used to map and convert its tags to cache addresses. In addition, a stash queue is used to store MSHR entries that are evicted due to hash collisions. For the stash queue, fully-associative search is implemented. The cache data and cache-miss information are stored in a single data SRAM, which has entries in the number that is equal to the sum of the entries of all of the metadata SRAMs. Each SRAM has two independent ports (hereinafter referred individually to as the first port A and the second port B). Each port allows simultaneously reading and writing operations for the same address, and the two ports can simultaneously operate two different addresses.

The step D2.2 is to build store-to-load forwarding circuits for the metadata SRAMs for data bypass. The present disclosure provides optimization for reading of memory requests and is about a read-only cache. Nevertheless, the SRAMs still have to perform writing operations in the process of updating metadata. It is thus important to set data bypass for forwarding the metadata, so as to ensure read-after-write data consistency in the pipelines. As for the data SRAM, since the pipelines access it in the last pipelining stage, there is no need to forward the data SRAM.

Preferably, the request-processing pipeline herein operates as below.

At the step D3.1, the request-processing pipeline monopolizes the first port of each said metadata SRAM for simultaneous search and reading; and/or
 monopolizes the first port of the data SRAM for reading cache data or writing cache-miss information; and/or
 allocates or updates the MSHR entry through the second port, each time for only one of the metadata SRAMs.

Specifically, the request-processing pipeline operates as below.

At the step S1, it receives a memory-access request, and uses a predetermined cache address mapping algorithm to perform computing on the tag related to the memory-access address, thereby obtaining the cache addresses of the corresponding entry in the metadata SRAMs.

The step S2 involves reading the memories according to the cache addresses obtained in S1 through the first ports of the metadata SRAMs, and obtaining the reading results at the end of the predetermined number of clock cycles.

The step S3 is to search the stash queue to determine whether in the stash queue there is an MSHR entry matching the tag of request.

At S4, the metadata of entries read at S2 are identified, and matching is made between the tags of the entries and that of the memory-access request. The match result is then considered together with the search results at S3 to determine whether the current request gets a hit and, if yes, determine the hit object (i.e., a cache entry or an MSHR entry).

Further, if the current request turns out to be a miss, processing depends on the actual situations. If the entries have idle sites, one of the idle sites is used for subsequent processing. If the entries have no idle sites but have cache entries, one of the cache entries is evicted for subsequent processing. If all of the entries read at S2 are already used as MSHR entries, one of them is evicted to the stash queue for storing the incoming cache-miss information.

At S5, according to the match results obtained at S4, cache data or cache-miss information is processed in one of the following ways.

C5.1 is the case where a hit happens at a cache entry. In this case, according to the serial number of the metadata SRAM in which the cache entry is located and its cache address, computing is performed to get the address of the corresponding cache data in the data SRAM and then the data required by the request is read through the first port of the data SRAM so as to generate a memory-access response.

C5.2 is the case where a hit happens at an MSHR entry. In this case, the sub-entry counter of the entry is updated (which means incrementing the sub-entry counter by 1), and written back through the second port of the corresponding metadata SRAM. Further, in a way similar to that described with respect to C5.1, the address of the corresponding entry in the data SRAM is obtained, and then the address of the first idle sub-entry is obtained according to the previous value of the sub-entry counter. Afterward, the current request is recorded in the sub-entry. The writing operation is done through the first port of the data SRAM. Particularly, if the request leads to a hit happening at an MSHR entry in the stash queue, what is to be updated is the stash queue but neither the metadata SRAMs nor the data SRAM.

C5.3 is the case where the request leads to a miss. In this case, an entry is selected according to the strategy described with respect to S4, and a writing operation is done through the second port of the corresponding metadata SRAM, wherein the writing operation includes writing the tag of the request cache line, setting the valid bit and the transfer flag bit, and initializing the sub-entry counter to 1. Further, similar to C5.2, the current request information is written into the corresponding address through the first port of the data SRAM. If an old MSHR entry is to be evicted, its cache-miss information is read out and stored into the stash queue. Additionally, a data request for the missed cache line is sent to the next-level memory.

Preferably, in C5.2 and C5.3, if the writing operation performed on the metadata SRAM and the reading operations performed on the request-processing pipeline or the response-processing pipeline are associative, which means that the address to which the current writing operation is made is identical to the address of these reading operations, the data currently written are redirected to a relevant pipelining stage so as to ensure that the data obtained through the reading operations are up to date.

Preferably, in the present disclosure, the response-processing pipeline comprises the following parts.

D3.2 includes performing search and reading simultaneously through the second port of each of the metadata SRAMs; and/or
reading the cache-miss information and writing the cache data through the second port of the data SRAM; and/or
releasing the MSHR entry through the second port of the metadata SRAM, wherein this operation is performed to just one metadata SRAM every time.

Specifically, the response-processing pipeline operates through the following steps.

At S6, it receives the memory-access response and computes the cache addresses according to the predetermined mapping algorithm so as to obtain the candidate storage addresses corresponding to the received cache line.

At S7, according to the addresses obtained at S6, the metadata SRAMs are read through their second ports, and the read results are obtained at the end of the predetermined number of clock cycles.

Preferably, a metadata SRAM that is performing a writing operation is not read.

The step S8 is performed by checking whether in the stash queue there is an MSHR entry matching the target tag. If yes, the entry is released, and the value of its sub-entry counter and the sub-entries are read out for subsequent use.

At S9, matching is made between the tags of the entries read at S7 and the target tag. The match result is considered together with that obtained at S8 to generate a composite match result. Specially, if all the effectively read tags do not match the target tag, and there is only one metadata SRAM not effectively read at S7, it can be concluded that the target entry must be at the corresponding location in the metadata SRAM that is not read. However, if not finding the target tag and more than one metadata SRAM are not read, the response is then reinserted to the start of the pipeline and waits for a reprocessing.

Preferably, for any of the metadata SRAMs, if the read memory address is the same as the memory address read by the request-processing pipeline at S4, there is a chance that the two pipelines will make writing to the same address of the metadata SRAM. At this time, response-processing pipeline is stalled so as to prevent writing conflict at this address. Alternatively, the request-processing pipeline is stalled.

At S10, deallocation of the entry is made in one of the following ways according to the match result obtained at S9.

C10.1 is the case where the target MSHR entry is found in SRAMs. In this case, the transfer flag bit of the entry is unset to serve as a cache entry, and the metadata is then written back to the corresponding metadata SRAM through its second port. Further, reading and writing operations are performed simultaneously to the corresponding address of the data SRAM through the second port, so as to read the sub-entries (i.e., the cache-miss information) and writing the cache data returned by the next-level memory. If the writing operation performed on the metadata SRAM and the reading operations performed by the request-processing pipeline or the response-processing pipeline are associative, which means that the address to which the current writing operation is made is identical to the address of these reading operations, the data currently written are redirected to a relevant pipelining stage so as to ensure that the data obtained through the reading operations are up to date.

C10.2 is the case where the target MSHR entry is in the stash queue. In this case, the sub-entries are obtained from the stash queue. Then, the entry is set to invalid, which means that the requested cache line will not be written to the entry, and the entry will not serve as a cache entry.

C10.3 is the case where the target MSHR entry is not found among the effectively read metadata. In this case, the received response has to be reintroduced into the response-processing pipeline to be processed without undergoing the subsequent operations. In other words, the response will be reprocessed starting from step S6.

At S11, responses to the processors are generated according to the returned cache data and the cache-miss information recorded in the sub-entries.

Preferably, the step D3 further comprises the following steps.

At D3.3, the request-processing pipeline and the response-processing pipeline share second ports of the metadata SRAMs. Therein, if port contention happens at any metadata SRAM, operations are to performed either in a priority order of: writing by the request-processing pipeline, writing by the response-processing pipeline, and reading by the response-processing pipeline; or in a priority order of: writing by the response-processing pipeline, writing by the request-processing pipeline, and reading by the response-processing pipeline.

Preferably, when contention happens between writing by the request-processing pipeline and writing by the response-processing pipeline, the response-processing pipeline is stalled or the request-processing pipeline is stalled.

Preferably, the step D3 further comprises the following steps.

At D3.4, for the second ports of the metadata SRAMs, if contention happens between reading by the response-processing pipeline and writing by either of the pipelines, the response-processing pipeline keeps reading the metadata SRAMs that are not subject to writing. When the target MSHR entry is not found, and if there is only one metadata SRAM not read due to port contention, it can be concluded that the target is in the unread metadata SRAM. If there are plural metadata SRAMs not read due to port contention, the current deallocation operation is returned to the inlet of the pipeline and executed again.

Preferably, the request-processing pipeline allocates or updates MSHR entries through the second ports of the metadata SRAMs and the response-processing pipeline deallocates MSHR entries through the second port of the metadata SRAMs. The request-processing pipeline and the response-processing pipeline each perform the foregoing respective operation on one metadata SRAM in one cycle.

The present disclosure operates with the step of using the request-processing pipeline to process memory-access requests and the step of using the response-processing pipeline to process memory-response data, wherein each of the steps is completed in a hardware clock cycle (a pipeline stage).

With the parallel dual-pipeline design, the present disclosure allows memory-access requests and memory-access response to be processed separately and simultaneously. Such a design leverages the dual-port feature of SRAMs in an FPGA to achieve reasonable and efficacious allocation, thereby preventing pipeline contention between request processing and response processing, and improving the cache throughput. The present disclosure also well addresses issues such as consistency for data reading and writing in the two pipelines, memory port contentions, and writings at the same address, so as to ensure accuracy.

Preferably, the present disclosure further provides a cache structure, which may comprise:

plural independent metadata SRAMs, for storing metadata of cache and MSHR entries;

a data SRAM, for storing the data fields (i.e., cache lines and cache-miss information) of all the entries corresponding to the metadata SRAMs;

a request-processing pipeline, for processing the memory-access requests from processors to the cache; and a response-processing pipeline, for processing the memory-access responses from the next-level memory.

DETAILED DESCRIPTION OF THE APPLICATION

The following preferred embodiments when read with the accompanying drawings are made to clearly exhibit the above-mentioned and other technical contents, features and effects of the present disclosure. Through the exposition by means of the specific embodiments, people skilled in the art would further understand the technical means and effects the present disclosure adopts to achieve the above-indicated objectives. However, it should be understood that the present disclosure can be implemented in many other forms and is not limited to the modes described in this disclosure.

The present disclosure provides a cache-designing method where the storage space is shared between cache data and cache-miss information, which comprises the following steps.

At the step D1, cache entries and miss status holding register (MSHR) entries are implemented by means of shared storage. In other words, cache data and cache-miss information are stored in a common storage space.

The step D2 involves storing metadata of cache lines and MSHR entries on one hand as well as the cache lines and cache-miss information separately into different static random-access memories. Therein, the metadata of the cache lines are stored in plural independent static random-access memories (hereinafter referred to as the metadata SRAMs) while the cache lines and the cache-miss information are stored in a single static random-access memory (hereinafter referred to as the data SRAM).

At D3, a request-processing pipeline and a response-processing pipeline are constructed to be parallelable. Therein, the request-processing pipeline is used to process memory-access requests, and the response-processing pipeline is used to perform memory-response data processing.

Figure 1:
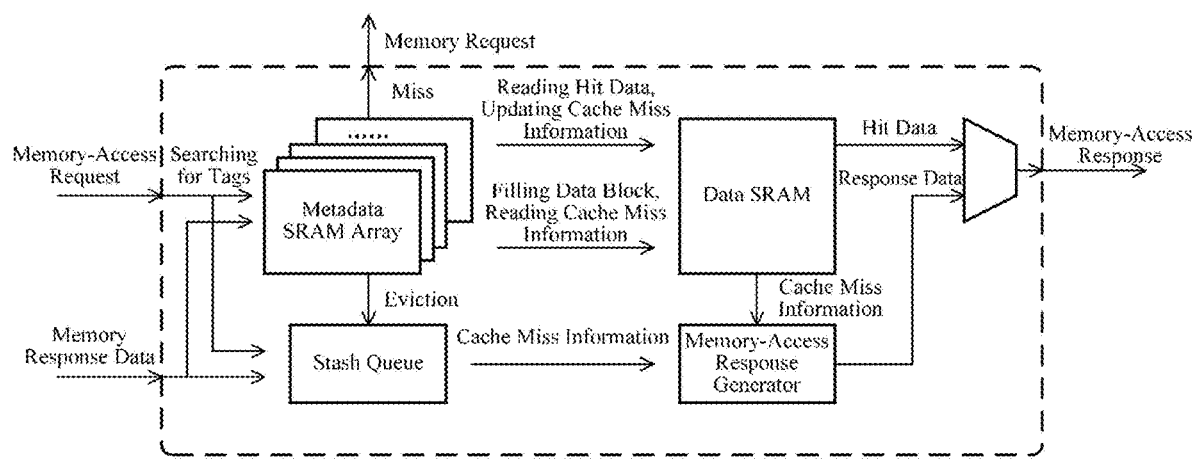
FIG. 1 is a hardware diagram of a cache that is designed to record cache-miss information in cache lines according to a preferred mode of the present disclosure.

The disclosed cache-designing method provides a cache structure as shown in FIG. 1. According to the design method, the following hardware modules are used.

a. A metadata SRAM array is used for storing the metadata of the cache entries, as well as the tags of MSHR entries. To process a memory-access request from an application, search is made among the metadata SRAMs according to the tag of the required cache line so as to determine whether the cache line exists in the cache, or whether there is corresponding cache-miss information. To process the cache lines returned by the memories, the corresponding MSHR entry is searched among the metadata SRAMs according to the tag of the cache line, so as to acquire the cache-miss information of the cache line to be accessed.

b. A data SRAM is used to store application cache lines and cache-miss information (i.e., sub-entries of the cache-miss information). To process a memory-access request from the application, after an effective cache line is found in the metadata SRAM array, the contents of the cache entry are read from the data SRAM and returned to the application. Alternatively, after an effective MSHR entry is found, the data SRAM is updated with the corresponding cache-miss information. To process the cache line returned by the memory, the corresponding cache-miss information (i.e., the memory-access request information for accessing the cache line) is read from the data SRAM and the cache line is filled into the data SRAM.

c. A stash queue is used for storing MSHRs that are evicted from the SRAMs due to hash collisions. When the entry that matches the tag of the address of the current memory-access request cannot be found at the corresponding cache address of any of the metadata SRAMs, and all the entries are valid MSHRs, one of the entries is evicted and moved to the stash queue, and the space of the evicted entry is used to store the cache-miss information of the current memory-access request.

d. A memory access response generating module is used for parsing the cache-miss information when the missing cache line is returned, and generating a memory access data response according to the recorded cache-miss information (i.e., the sub-entries).

Figure 2:
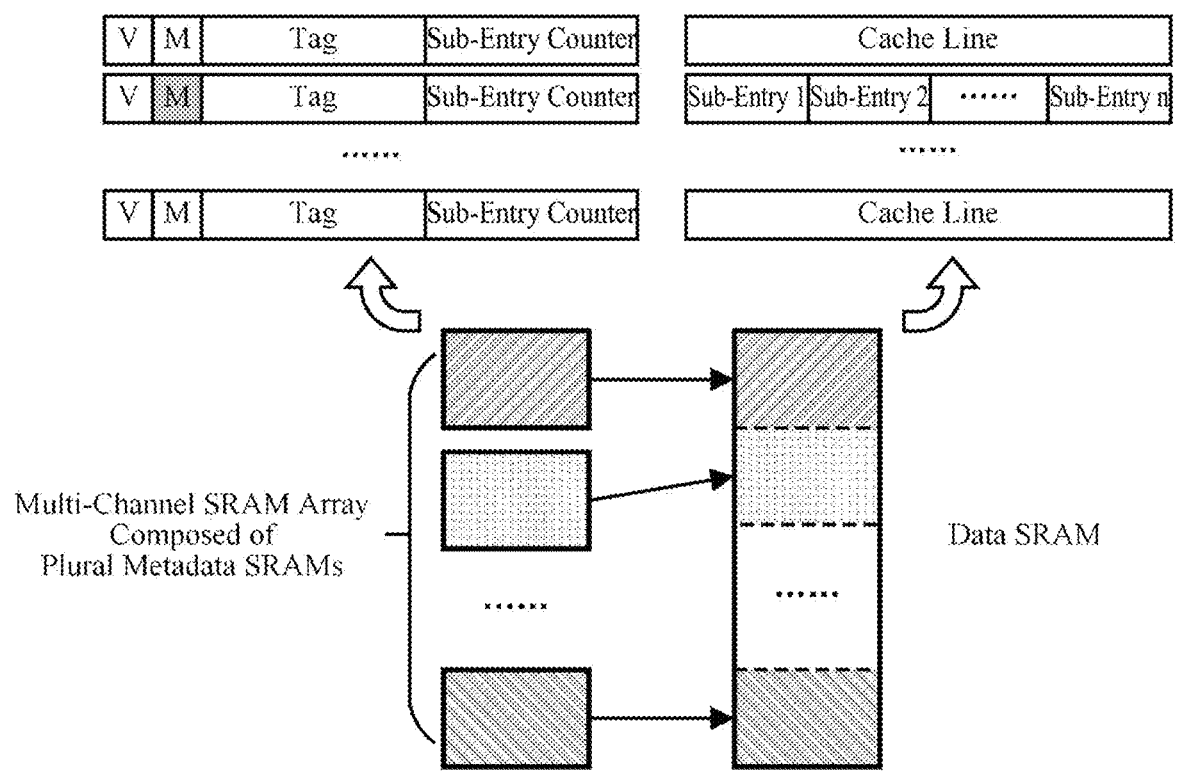
FIG. 2 is a diagram showing a storage structure according to a preferred mode of the present disclosure.

According to a preferred mode, the cache-designing method of the present disclosure adopts the organizational structure for storage as shown in FIG. 2. The organizational structure of storage comprises a multi-channel SRAM array composed of plural metadata SRAMs and one data SRAM. Storage spaces in the metadata SRAMs and the data SRAM are in one-to-one correspondence. Specifically, the metadata SRAMs are for storing metadata related to cache entries, and the data SRAM is for storing the cache lines and cache-miss information (i.e., the sub-entries of the cache-miss information).

According to a preferred mode, as shown in FIG. 2, the cache lines are able to be used to record the cache-miss information, and the metadata SRAMs store the metadata related to the cache data and the sub-entry counter for recording the entry number of the missed-request information. The metadata related to the cache data includes the valid bit V, the transfer flag bit M, and the tag. The data SRAM stores cache lines and (i.e., cache-miss information (or sub-entries of the cache-miss information). Specifically, in the event of a miss, the cache line to which the missing data are to be stored is used as the MSHR entry. Further, when the missing data is returned, the data is placed into this line, which now acts as a cache line.

According to a preferred mode, as shown in FIG. 2, metadata such as the valid bit (V), the tag of the cache line, the transfer flag bit (M), and the sub-entry counter are stored in static random-access memories different from those storing the cache lines and the cache-miss information (i.e., the metadata SRAMs and the data SRAM, respectively). Similar to multiple-set associative mapping, tags of the cache lines are mapped and stored through plural Cuckoo hash functions, so as to enhance the load factors for hash storage. Therefore, plural SRAMs are used for storage and for parallel reading. Different hash functions are used for mapping the tags of the requested cache data to the cache addresses, each hash function corresponding to a different SRAM.

Further, cache lines and cache-miss information are stored in a single SRAM, which has entries in the number that is equal to the total number of the entries of all metadata SRAMs, so that the data lines and the tags are in one-to-one correspondence. Specifically, the data SRAM is spatially divided into equal regions so that the number of the regions is equal to the number of the metadata SRAMs, which means one region of the data SRAM corresponds to one metadata SRAM. Particularly, each SRAM has two independent ports (hereinafter referred individually to as the first port A and the second port B). Each port allows simultaneously reading and writing operations for the same address.

Figure 3:
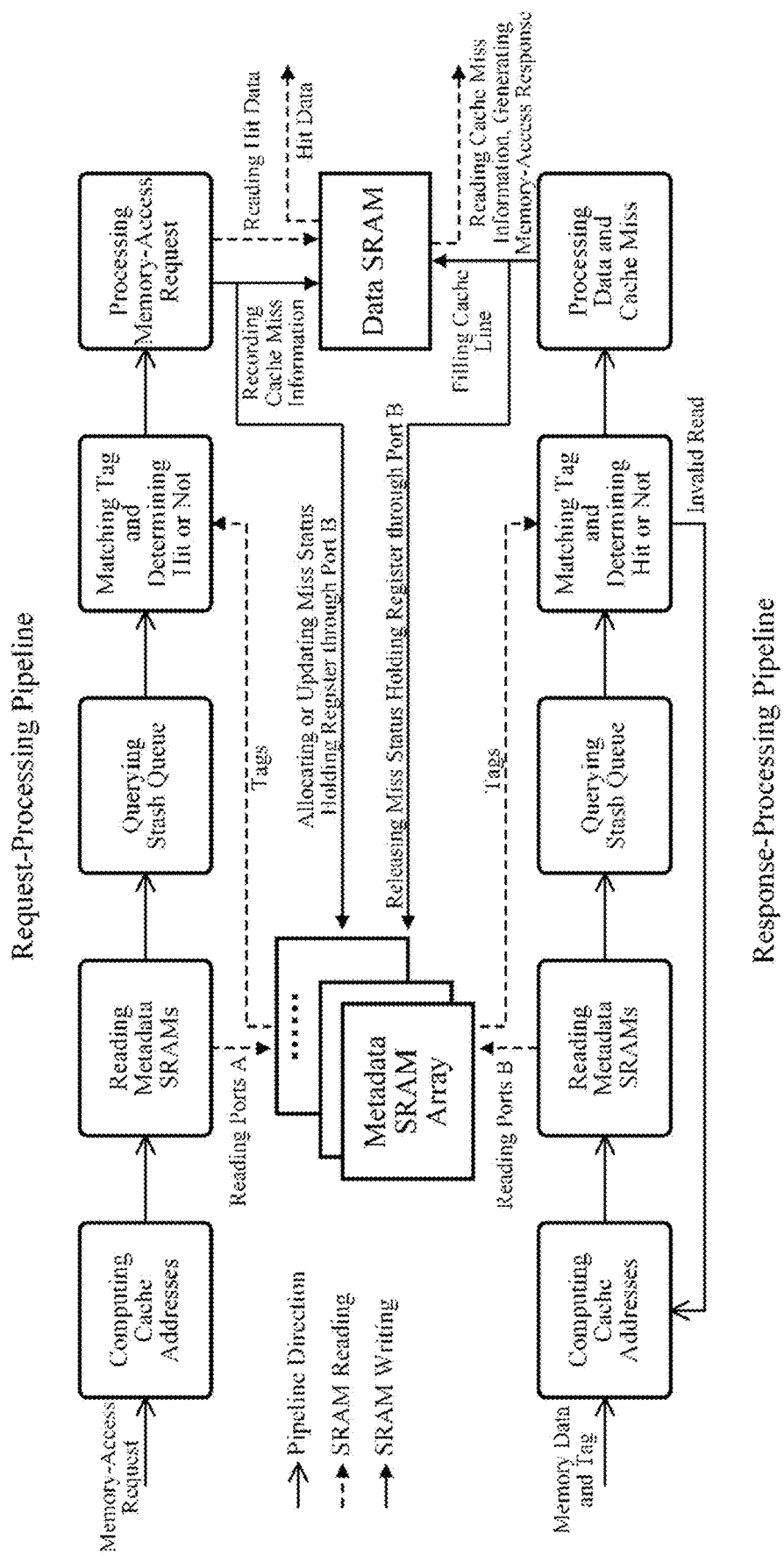
FIG. 3 illustrates a dual-pipeline architecture designed according to a preferred mode of the present disclosure and its processing flow.

In the present disclosure, the cache-designing method adopts a dual-pipeline architecture. As shown in FIG. 3, the dual-pipeline architecture may comprise a request-processing pipeline and a response-processing pipeline. Specifically, the request-processing pipeline is used to process memory-access requests, and the response-processing pipeline is used to process memory-response data. Particularly, the two pipelines, namely the request-processing pipeline and the response-processing pipeline, can operate in parallel.

According to a preferred mode, as shown in FIG. 3, the request-processing pipeline processes a memory-access request through successive steps including: computing the cache address; reading the metadata SRAM; querying the stash queue; matching the tag to determine a hit or not; and processing the match result based on predetermined memory-access request processing logic. Meanwhile, as shown in FIG. 3, the response-processing pipeline processes the memory-response data through successive steps including: computing the cache address; reading the metadata SRAM; querying the stash queue; matching the tag to determine a hit or not; and processing the match result based on predetermined memory data processing logic.

For further expounding the working principle and process of the present disclosure, particular hardware modules and processing flows thereof are describes with reference to an example case in which a logic of an application accesses memory data through the cache according to the present disclosure. It is herein assumed that the data word required to be accessed by the application is of a size of 1 byte, and a cache line is of a size of 16 bytes, while a memory address is composed by bytes. The cache uses a four-channel metadata SRAM array.

The application now accesses a data word having a memory address of 0xBA75, and the memory access ID is 0. Then the tag of the cache line in which the data word is located is 0xBA7, and the accessed data word has an offset of 0x5 in the cache line.

After the memory-access request enters the request-processing pipeline, it is processed through the following steps.

S1 is about hash computing for determining the cache addresses. At this step, the pipeline receives the memory-access request, and computes the cache addresses of the corresponding entries in the metadata SRAMs based on the tag, 0xBA7, of the memory access address using four different hash functions. The results are 0x05, 0xB1, 0x3F, and 0x84 in this example.

S2 is about reading the metadata SRAMs. According to the cache addresses obtained at S1, the metadata SRAMs are read in parallel through their first ports (e.g., ports A), and read results are obtained at the end of the predetermined number of clock cycles (such as 2 clock cycles).

S3 is about querying the stash queue. This step is to determine whether in the stash queue there is an MSHR entry matching the tag, 0xBA7, of the memory access address.

S4 is about matching the tag to determine whether this is a hit or not. The contents of the entries of the metadata SRAMs read at S2 (or pipeline forwarding contents) are obtained. The tags of these entries are compared with the tag, 0xBA7, of the memory access address, and the match results are considered together with the query result obtained at S3 to generate a composite match result that indicates whether the current request leads to a hit and whether it hits a cache entry or an MSHR entry. If the composite match result indicates a miss and an MSHR entry has to be evicted, the evicted MSHR will be stored in the stash queue.

At S5, the match result obtained at S4 is processed using the predetermined memory-access request processing logic. Particularly, the result of matching the tag may be one of the following: the request leading to a hit at a cache entry; the request leading to a hit at an MSHR entry; and the request leading to a miss.

Depending on the foregoing different cases of the match result obtained at S4, one of the following procedures is performed.

C5.1 is the case where the request leads to a hit at a cache entry. For example, an effective entry tagged 0xBA7 is read from the Metadata SRAM 1 at the address 0x05, and the entry has its transfer flag bit M unset. This indicates that the hit happens at the cache entry. According to the serial number of the metadata SRAM in which the cache entry is located and its cache address, the address of the corresponding data in the data SRAM (e.g., 0x005) is figured out, and the data required by the request are read out from Port A of the data SRAM. Then the data word that has an offset of 0x5 as required by the request is picked up and used to generate a memory access response.

C5.2 is the case where the request leads to a hit happening at an MSHR entry. For example, an effective entry having a tag of 0xBA7 is read from Metadata SRAM 2 at the address 0xB1, and the entry has its transfer flag bit M set already. This indicates that the hit happens at an MSHR entry. At this time, its sub-entry counter is incremented by 1, and the updated contents are written back through Port B of Metadata SRAM 2 where the sub-entry counter is located. Further, similar to C5.1, the address of the corresponding cache-miss information in the data SRAM is obtained (e.g., 0x1B1), and then the address of the next idle sub-entry slot is obtained according to the previous value of the sub-entry counter. The current cache-miss information (intra-line offset: 0x5, memory access ID: 0) is recorded into the slot, and the writing operation is done through Port A of the data SRAM. Particularly, if the request leads to a hit happening at an MSHR entry in the stash queue, what is to be updated is the corresponding entry in the stash queue but neither the metadata SRAMs nor the data SRAM.

C5.3 is the case where the request leads to a miss. In this case, there is not an entry tagged as 0xBA7 found in any of the metadata SRAMs at the address figured out at S1. A metadata SRAM corresponding to an idle or evicted entry is selected. Herein the selected one is Metadata SRAM 3, for example. At the address 0x3F in Metadata SRAM 3, allocation of an MSHR for the current request is made through Port B by writing the tag 0xBA7 of the missing data, setting the valid bit (V) and the transfer flag bit (M), and initializing the sub-entry counter to 1. Further, similar to C5.2, through Port A of the data SRAM, the current cache-miss information (intra-line offset: 0x5, memory access ID: 0) is written at the corresponding address (e.g., 0x23F). Particularly, if the MSHR originally at the address 0x23F is to be evicted, its cache-miss information is read and stored into the stash queue. Additionally, the tag of the missing cache data is recorded in the memory request queue, and a data request is sent to the memory.

When the missing cache line tagged 0xBA7 is returned, the response-processing pipeline performs processing through the following steps.

S6 is about hash computing for determining the cache addresses. At this step, the pipeline receives the memory-response data and the corresponding tag, 0xBA7, dequeued from the memory request queue, and computes the cache addresses of the corresponding entries in the metadata SRAMs based on the tag, 0xBA7, using different hash functions (same as those obtained at S1). The results are 0x05, 0xB1, 0x3F, and 0x84, respectively.

S7 is about reading the metadata SRAMs. According to the addresses obtained at S6, the metadata SRAMs are read in parallel through their second ports (e.g., ports B), and read results are obtained at the end of the predetermined number of clock cycles (such as 2 clock cycles).

Figure 4:
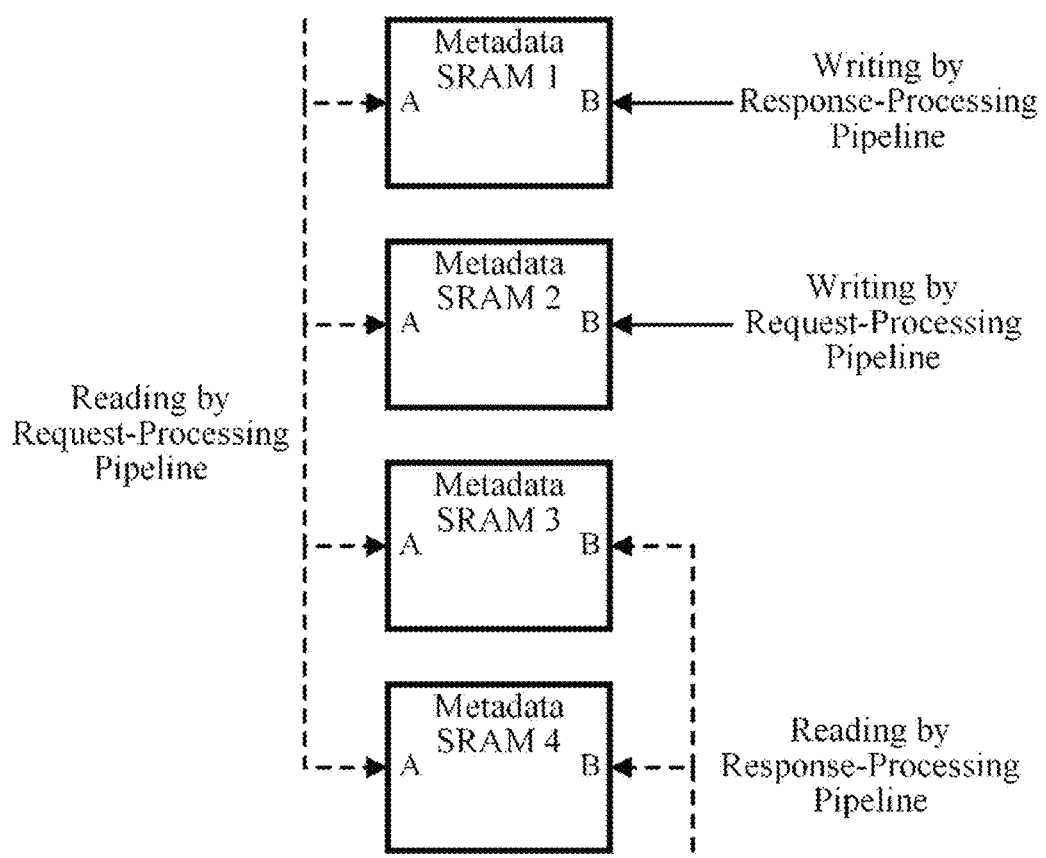
FIG. 4 illustrates a preferred example of accessing ports of metadata SRAMs based on the dual-pipeline architecture according to the present disclosure.

To be specific, if some metadata SRAM is undergoing a writing operation, which means that its Port B is occupied, this metadata SRAM will not be read for the time being. The example shown in FIG. 4 illustrates reading and writing at 4 metadata SRAMs in a certain clock cycle. When the two pipelines write Metadata SRAMs 1 and 2 through their ports B, respectively, the response-processing pipeline only performs parallel reading on Metadata SRAMs 3 and 4 through their ports B.

S8 is about querying the stash queue to see whether in the stash queue there is an MSHR entry matching the current data tag, 0xBA7, and if yes, releasing the found MSHR, and reading the value of the corresponding sub-entry counter and the cache-miss information for subsequent use.

S9 is about matching the tag to determine whether this is a hit or not. Herein, the effective storage contents (or pipeline forwarding contents) of the SRAMs read at S7 are obtained and matched with the tag of the current data, 0xBA7, and the match results are considered together with the query result obtained at S8 to generate a composite match result. If in the effectively read metadata SRAMs and the stash queue there is not any MSHR found to match the current data tag 0xBA7, and only one metadata SRAM is not effectively read at S7 due to the writing operation, it can be concluded that the target MSHR entry tagged 0xBA7 is at the corresponding location in the metadata SRAM that is not effectively read. Then this case is also a hit. For example, when the metadata SRAMs are read at S7, Metadata SRAM 2 is not being read due to the ongoing writing operation, and there is not a missing status register tagged 0xBA7 existing in any of Metadata SRAMs 1, 3 and 4 and the stash queue, it is determined that the target MSHR is at the address 0xB1 in Metadata SRAM 2. Particularly, for a certain metadata SRAM, if the read SRAM address is the same as the SRAM address read by the request-processing pipeline at S4, there is a chance that the two pipelines will make writing to the same address of the metadata SRAM. At this time, the request-processing pipeline or the response-processing pipeline has to be stalled so as to prevent writing conflict at this address.

At S10, according to the match result obtained at S9, one of following predetermined memory data processing logics is used for processing.

C10.1 is the case where a hit happens at an MSHR entry in a metadata SRAM. For example, the corresponding entry is found at the address 0x84 in Metadata SRAM 4, so its transfer flag bit (M) will be unset, and the contents will be written back to the corresponding metadata SRAM through Port B, so that the entry can be used as a cache entry. Through Port B of the data SRAM, reading and writing operations are performed at the corresponding address (e.g., 0x384) simultaneously. Then the sub-entry information (i.e., the cache-miss information) of the MSHR is read out and the cache data returned by the memory is written in.

C10.2 is the case where a hit happens at an MSHR entry in the stash queue. In this case, the value of the corresponding sub-entry counter and the cache-miss information read at S8 are obtained from the stash queue.

C10.3 is the case where there is a miss. This indicates that the metadata SRAM in which the target MSHR entry is located is not effectively read due to port contention, so the current data and its tag have to be reintroduced into the response-processing pipeline to be processed without undergoing the subsequent operations. In other words, the current operation will be executed from the step S6 again.

At S11, the value of the sub-entry counter of the released MSHR, the cache-miss information just read out, and the returned cache line that has the tag of 0xBA7 are parsed by the memory access response generating module to generate memory access responses. For example, if the cache-miss information recorded by the released MSHR entry includes: the tag of the missing cache line, 0xBA7; the value of the sub-entry counter, 1 (meaning that it only records the information of one miss request); the offset of the data word inside the cache line as required by one miss request, 0x5; and its memory access ID, 0, then the data word having an offset of 0x5 in the cache line tagged 0xBA7 as required by the request is selected to generate a memory access response having a response ID of 0 and sent to the application.

The present disclosure provides a cache-designing method and in a cache designed accordingly the cache lines are used to not only store application data but also register cache-miss information (Miss). The method is suitable for any hardware architecture that features high-parallelism memory accessing, such as a field-programmable gate array (FPGA). Opposite to the known methods that use additional miss status holding registers (MSHRs) to store cache-miss information, the present disclosure makes cache lines and the MSHRs share the same SRAM space, thereby reducing the capacity required for static storage and supporting a large number of MSHRs. The cache can adapt itself to memory access hits or misses of the application during operation, thereby automatically shifting the role of the storage space between cache lines and MSHRs, making the cache able to adapt itself to different memory access characteristics.

As compared to the existing non-blocking cache designs that support the use of a large number of MSHRs, the present disclosure provides a cache-designing method where cache data and cache-miss information share the same storage space. The cache designed using this method is adaptable to locality of memory access for different applications while preserving the non-blocking feature (for processing a lot of misses simultaneously). This eliminates the need of making application-specific configuration of MSHRs, and thereby prevents resource waste or performance limitation due to improper configuration. Additionally, with the two pipelines working in parallel, the present disclosure improves memory access throughput of a cache system.

Furthermore, the present disclosure leverages the dual-port feature of static random-access memories in the FPGA to design separate pipelines for processing memory-access requests and for processing memory-response data, respectively, so that the two parts can work in parallel, thereby overcoming port contention at SRAMs due to storage sharing between cache lines and MSHRs, so as to improve memory access throughput.

It would be appreciated by people skilled in the art that further steps and/or operations may exist before, after and/or between the foregoing steps in order to, for example, further optimizing and/or improving the disclosed method as long as the objectives of the present disclosure can be achieved. Moreover, while the disclosed method has been displayed and described as a series of steps to be conducted in a particular order, it is understandable that the method is not limited to the described order. For example, some steps may be conducted in an order different from that described herein or different steps may be conducted simultaneously.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably", "according to one preferred mode" or "optionally". Each of the inventive concepts represents an independent conception and the applicant reserves the right to file one or more divisional applications therefor.

What is claimed is:

1. A cache-designing method where cache data and cache-miss information share the same storage space, the method comprising:
   D1: storing cache data and cache-miss information in a common storage space by means of shared storage;
   D2: storing metadata of cache and MSHR entries on one hand, as well as cache lines and cache-miss information on the other hand, separately in different static random-access memories (SRAMs);
   D3: constructing a request-processing pipeline and a response-processing pipeline that are parallelable, wherein the request-processing pipeline is used to process memory-access requests, and the response-processing pipeline is used to process memory-response data.

2. The cache-designing method of claim 1, wherein the step D1 comprises:
   D1.1: when a cache miss happens, using the entry, in which the missing cache lines is supposed to be stored, as an MSHR so as to the record cache-miss information; and
   D1.2: adding one transfer flag bit to each of the cache lines, so as to determine whether a said cache line is used as the MSHR based on the corresponding transfer flag bit during search of the cache data.

3. The cache-designing method of claim 2, wherein step D2 comprises:
   D2.1: the SRAMs storing the metadata of the cache and MSHR entries are implemented as multiple independent metadata SRAMs, and the SRAM storing the cache lines and the cache-miss information is implemented as a single data SRAM, wherein the data SRAM has entries thereof arranged in one-to-one correspondence with entries of the metadata SRAMs; and
   D2.2: building store-to-load forwarding logic on the metadata SRAMs for data bypass.

4. The cache-designing method of claim 3, wherein the step D3 comprises:
   D3.1: making the request-processing pipeline monopolize the first port of each said metadata SRAM for simultaneous reading the tags of cache entries; and/or
   monopolize the first port of the data SRAM for reading the cache data or writing the cache-miss information; and/or
   allocating or updating the MSHR entry through the second port of each said metadata SRAM; and
   D3.2: making the response-processing pipeline perform simultaneous cache tag reading through the second ports of the metadata SRAMs; and/or
   read the cache-miss information and write the cache data through the second port of the data SRAM; and/or
   release the MSHRs through the second ports of the metadata SRAMs.

5. The cache-designing method of claim 4, wherein the step D3 further comprises:
   D3.3: making the request-processing pipeline and the response-processing pipeline share the second ports of the metadata SRAMs, wherein if port contention happens in any of the metadata SRAMs, operations are performed either in the following priority order: writing by the request-processing pipeline, writing by the response-processing pipeline, and reading by the response-processing pipeline; or in the following priority order: writing by the response-processing pipeline, writing by the request-processing pipeline, and reading by the response-processing pipeline.

6. The cache-designing method of claim 5, wherein the step D3 further comprises:
   D3.4: for the second ports of the metadata SRAMs, when contention between reading by the response-processing pipeline and writing by any of the pipelines happens, making the response-processing pipeline read the other metadata SRAMs which are not being written, and
   when the MSHR entry required by the response-processing pipeline is not read, if there is only one said metadata SRAM not being read due to port contention, determining that the required MSHR entry is in the metadata SRAM that is not being read and regarding this as a hit; or
   if there are plural said metadata SRAMs are not read due to port contention, returning the current releasing operation to the input of the response-processing pipeline for re-execution.

7. The cache-designing method of claim 6, wherein the step D1.1 further comprises:
   when the missing cache line is returned, generating memory access responses according to the cache-miss information recorded by the corresponding MSHR, and converting the MSHR to a cache line by filling the data into the MSHR entry.

8. The cache-designing method of claim 7, wherein the D1.2 further comprises:
   add one sub-entry counter to each said cache line for counting the number of entries of cache-miss information that access the missing cache line, and the counter is used when the cache line is acting as an MSHR entry.

9. The cache-designing method of claim 8, wherein the step D3.4 further comprises:

when port contention between writing by the request-processing pipeline and writing by the response-processing pipeline happens, stalling the response-processing pipeline or stalling the request-processing pipeline.

10. The cache-designing method of claim 9, wherein the request-processing pipeline allocates or updates the MSHRs through the second ports of the metadata SRAMs, and the response-processing pipeline releases the MSHRs through the second ports of the metadata SRAMs; both the request-processing pipeline and the response-processing pipeline respectively perform their operations on only one said metadata SRAM in each cycle.

11. A cache-designing system where cache data and cache-miss information share the same storage space, the system being configured for:
D1: storing cache data and cache-miss information in a common storage space by means of shared storage;
D2: storing metadata of cache and MSHR entries on one hand, as well as cache lines and cache-miss information on the other hand, separately in different static random-access memories (SRAMs);
D3: constructing a request-processing pipeline and a response-processing pipeline that are parallelable, wherein the request-processing pipeline is used to process memory-access requests, and the response-processing pipeline is used to process memory-response data.

12. The cache-designing system of claim 11, wherein the step D1 comprises:
D1.1: when a cache miss happens, using the entry, in which the missing cache lines is supposed to be stored, as an MSHR so as to the record cache-miss information; and
D1.2: adding one transfer flag bit to each of the cache lines, so as to determine whether a said cache line is used as the MSHR based on the corresponding transfer flag bit during search of the cache data.

13. The cache-designing system of claim 12, wherein the step D2 comprises:
D2.1: the SRAMs storing the metadata of the cache and MSHR entries are implemented as multiple independent metadata SRAMs, and the SRAM storing the cache lines and the cache-miss information is implemented as a single data SRAM, wherein the data SRAM has entries thereof arranged in one-to-one correspondence with entries of the metadata SRAMs; and
D2.2: building store-to-load forwarding logic on the metadata SRAMs for data bypass.

14. The cache-designing system of claim 13, wherein the step D3 comprises:
D3.1: making the request-processing pipeline monopolize the first port of each said metadata SRAM for simultaneous reading the tags of cache entries; and/or
monopolize the first port of the data SRAM for reading the cache data or writing the cache-miss information; and/or
allocating or updating the MSHR entry through the second port of each said metadata SRAM; and
D3.2: making the response-processing pipeline perform simultaneous cache tag reading through the second ports of the metadata SRAMs; and/or
read the cache-miss information and write the cache data through the second port of the data SRAM; and/or
release the MSHRs through the second ports of the metadata SRAMs.

15. The cache-designing system of claim 14, wherein the step D3 further comprises:
D3.3: making the request-processing pipeline and the response-processing pipeline share the second ports of the metadata SRAMs, wherein if port contention happens in any of the metadata SRAMs, operations are performed either in the following priority order: writing by the request-processing pipeline, writing by the response-processing pipeline, and reading by the response-processing pipeline; or in the following priority order: writing by the response-processing pipeline, writing by the request-processing pipeline, and reading by the response-processing pipeline.

16. The cache-designing system of claim 15, wherein the step D3 further comprises:
D3.4: for the second ports of the metadata SRAMs, when contention between reading by the response-processing pipeline and writing by any of the pipelines happens, making the response-processing pipeline read the other metadata SRAMs which are not being written, and
when the MSHR entry required by the response-processing pipeline is not read, if there is only one said metadata SRAM not being read due to port contention, determining that the required MSHR entry is in the metadata SRAM that is not being read and regarding this as a hit; or
if there are plural said metadata SRAMs are not read due to port contention, returning the current releasing operation to the input of the response-processing pipeline for re-execution.

17. The cache-designing system of claim 16, wherein the step D1.1 further comprises:
when the missing cache line is returned, generating memory access responses according to the cache-miss information recorded by the corresponding MSHR, and converting the MSHR to a cache line by filling the data into the MSHR entry.

18. The cache-designing system of claim 17, wherein the D1.2 further comprises:
add one sub-entry counter to each said cache line for counting the number of entries of cache-miss information that access the missing cache line, and the counter is used when the cache line is acting as an MSHR entry.

19. The cache-designing system of claim 18, wherein the step D3.4 further comprises:
when port contention between writing by the request-processing pipeline and writing by the response-processing pipeline happens, stalling the response-processing pipeline or stalling the request-processing pipeline.

20. The cache-designing system of claim 19, wherein the request-processing pipeline allocates or updates the MSHRs through the second ports of the metadata SRAMs, and the response-processing pipeline releases the MSHRs through the second ports of the metadata SRAMs; both the request-processing pipeline and the response-processing pipeline respectively perform their operations on only one said metadata SRAM in each cycle.

* * * * *